O. M. BERGSTROM.
TIRE PUMPING ATTACHMENT FOR AUTOMOBILES.
APPLICATION FILED SEPT. 23, 1909.
968,732.
Patented Aug. 30, 1910.
2 SHEETS—SHEET 1.
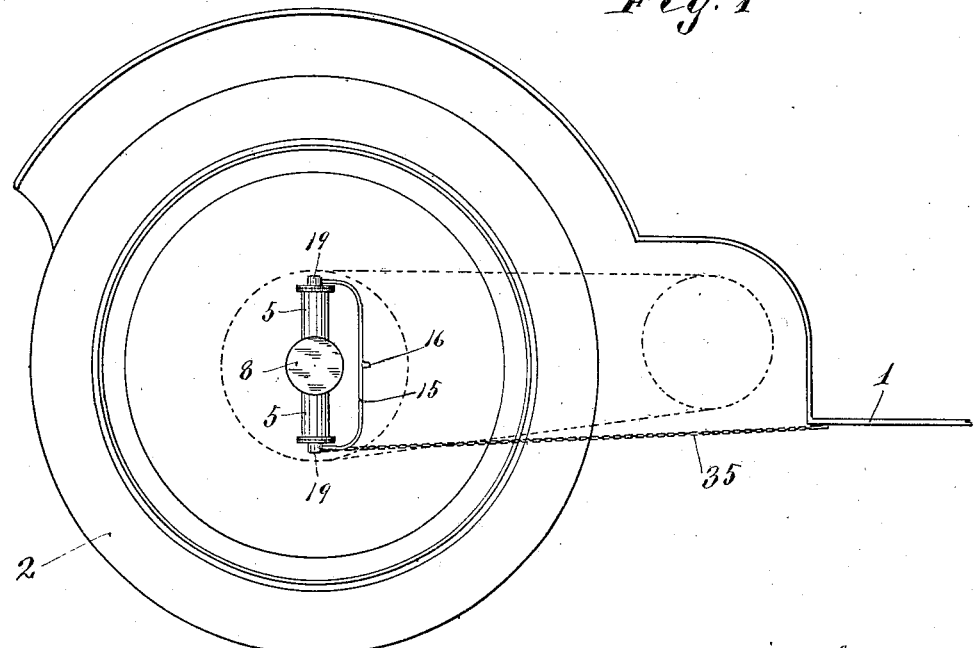
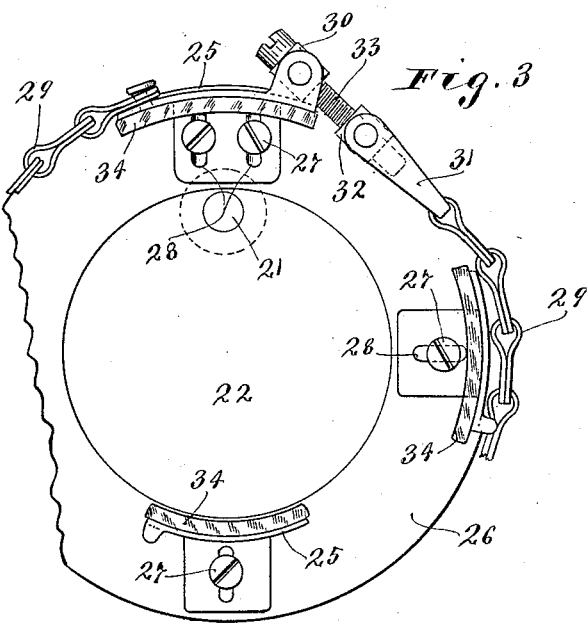
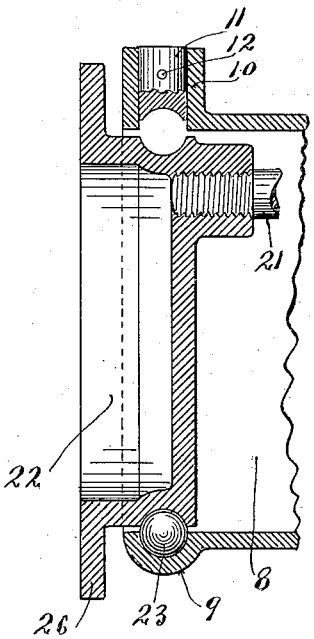
Witnesses.
A. H. Opsahl.
E. C. Skinkle
Inventor.
Oscar M. Bergstrom
By his Attorneys
Williamson & Merchant

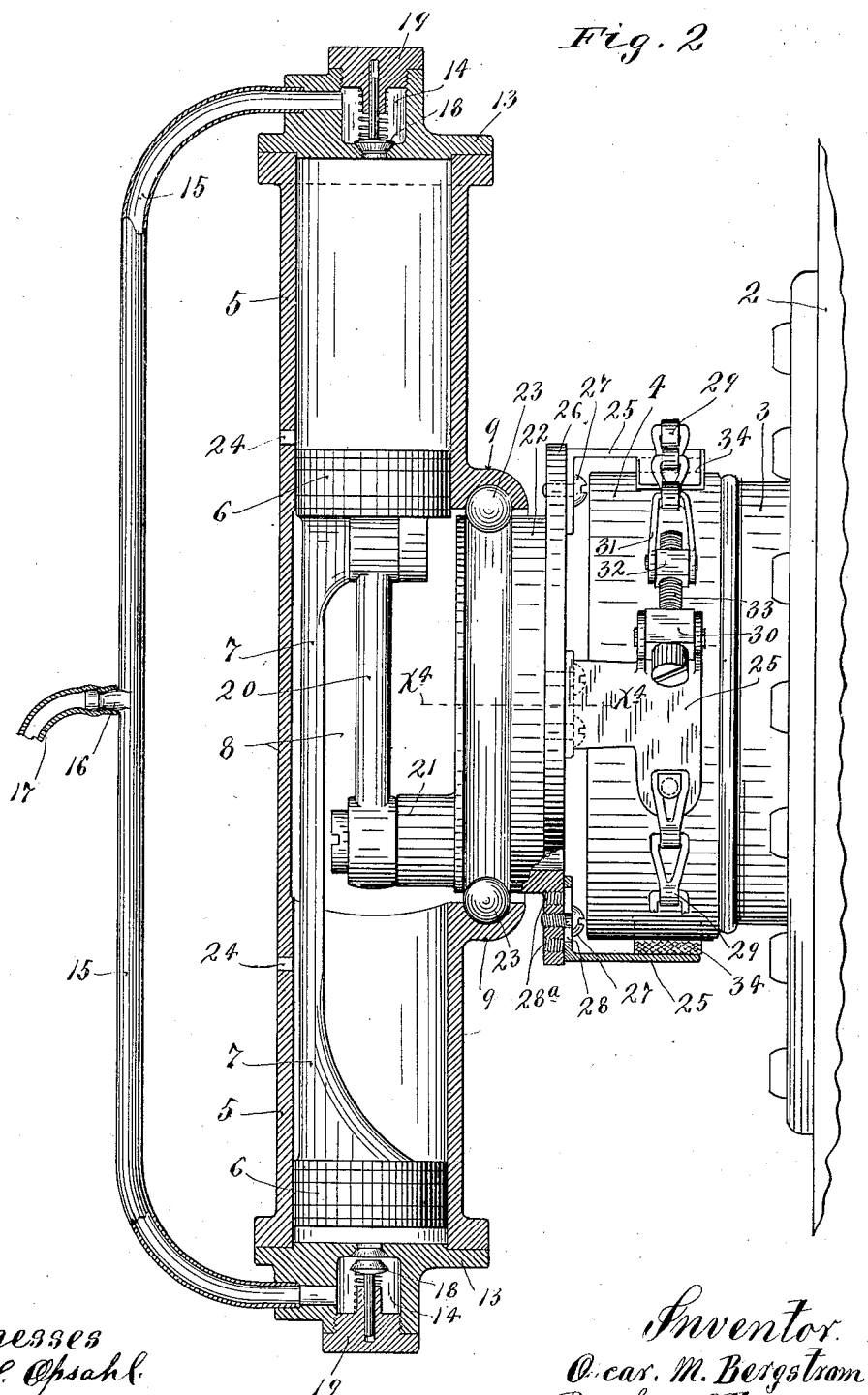

UNITED STATES PATENT OFFICE.

OSCAR M. BERGSTROM, OF MINNEAPOLIS, MINNESOTA.

TIRE-PUMPING ATTACHMENT FOR AUTOMOBILES.

968,732.     Specification of Letters Patent.     Patented Aug. 30, 1910.

Application filed September 23, 1909. Serial No. 519,119.

*To all whom it may concern:*

Be it known that I, OSCAR M. BERGSTROM, a citizen of the United States, residing at Minneapolis, in the county of Hennepin and State of Minnesota, have invented certain new and useful Improvements in Tire-Pumping Attachments for Automobiles; and I do hereby declare the following to be a full, clear, and exact description of the invention, such as will enable others skilled in the art to which it appertains to make and use the same.

My present invention has for its object to provide a simple and highly efficient air pump adapted to be applied to, and operated from one of the traction wheels of automobiles, and, to the above ends, the invention consists of the novel devices and combination of devices hereinafter described and defined in the claims.

The present invention is in the nature of an improvement on the devices disclosed and claimed in my prior application, S. N. 493,496, filed of date May 3rd, 1909, and entitled "Pumping attachment for automobiles."

In the accompanying drawings, which illustrate the invention, like characters indicate like parts throughout the several views.

Referring to the drawings, Figure 1 is a diagrammatic view in side elevation, showing the improved pump applied to one of the wheels of an automobile; Fig. 2 is a view, partly in elevation and partly in vertical section, showing the pump and the hub of the wheel to which it is applied; Fig. 3 is a side elevation with some parts broken away, showing the means for detachably securing the pump to the hub of the wheel; and Fig. 4 is a detail in horizontal section, taken approximately on the line $x^4$ $x^4$ of Fig. 2, some parts being removed and the crank of the rotary crank hub turned into a horizontal position.

Of the parts of the automobile, it is, for the purposes of this case, only desirable to particularly note the running board 1 and one of the rear traction wheels 2, which latter is provided on its hub 3 with a customary rigidly secured hub cap 4.

The improved pump comprises two axially alined cylinders 5 and two pistons 6, working one in each of said cylinders and rigidly connected by a laterally off-set tie bar 7 cast integral therewith. The two cylinders 5 at their rear ends are cast integral with a crank shaft casing 8, which latter, at its inner side, is formed with a laterally off-set annular flange in which is formed an internal concaved outer ball run-way 9. At one point, the ball run-way 9 is provided with an outwardly extended ball entrance passage 10, that is normally closed by a plug 11 rigidly, but detachably, secured therein by a diametric extended pin 12. This plug 11 is inserted in the passage 10 and secured therein by the pin 12, and the ball run-way 9 is formed when the said plug is thus in position. The ball run-way is, therefore, made continuous and smooth at the point where it passes the plug 11, and the plug may be removed and replaced as often as desired and, when in position, will complete the said run-way.

At their outer ends, the cylinders 5 are provided with rigidly secured heads 13, provided with air chambers 14 that are connected by an air discharge pipe 15. At its intermediate portion, the air discharge pipe 15 is provided with a discharge nipple 16, to which an air delivery hose 17 is applied. The air chambers 14 are normally closed by outwardly opening spring-closed check valves 18, the stems of which, as shown, are mounted in plugs 19 seated in the outer portions of the cylinder heads 13.

One of the pistons is directly connected to one end of a crank rod 20, which rod, at its other end, is pivoted to a wrist pin 21 of a crank hub 22. This crank hub, so-called, is provided with a peripheral groove which constitutes the inner run-way for bearing balls 23, arranged to work in the same and in the internal groove or outer ball run-way 9. The cylinders 5, near their inner extremities, are shown as provided with air in-take ports 24.

The crank hub 22 is provided with improved means for rigidly but detachably securing the same to the hub cap 4. This improved means comprises a multiplicity of laterally projecting circumferentially spaced clamping arms 25, the base ends of which are clamped to a projecting flange 26 of said crank hub 22, with freedom for radial adjustments by means of screws 27 that work through slots 28 in said brackets and are adapted to be screwed to any one of several radially spaced threaded perforations 28ᵃ in the said flange 26. A clamping chain 29 is attached to one extremity of one of the clamping arms 25 and, to the other extremity of this same arm, is pivotally attached a block 30. The chain 29 is passed loosely over all the other clamping arms 25 and, at its free end, is provided with a yoke 31, to which a nut block 32 is pivotally attached. The two blocks 30 and 32 are adjustably connected by a screw 33, which is passed loosely through a perforation of the former and has threaded engagement with the latter. On their inner surfaces, the projecting ends of the clamping arms 25 are provided with pliable facings 34, preferably of leather, which are adapted to be clamped against the hub cap 4 by the chain 29 and its adjustable screwed coupling. In practice, the arms 25 should be set so that they will loosely fit the hub cap 4 and, when the pump is to be attached thereto, they will spring sufficiently under the action of the chain and its screwed coupling to insure a rigid connection between said cap 4 and the crank hub 22.

When the pump is attached to the wheel hub, it is adapted to be held against rotation by a chain or other suitable connection 35 attached to one of the cylinder heads at one end and, at its other end, to the running board 1 or other convenient part of the machine.

When the pump is to be used, the wheel, to which it is applied and from which it is to be driven, must be raised from the floor or ground and the opposite driving wheels should be left on the ground or floor to afford a proper base or reaction for the driving of the raised wheel by the automobile engine. When the pump is applied to one of the traction wheels, the tire of any one of the other three wheels may be charged from the pump, provided, of course, that the hose 17 is of sufficient length. If the tires of both traction wheels are to be charged, the pump must be first applied to one thereof and then to the other. In practice, I have found that, by the use of this improved pump, applied as illustrated, an automobile tire may be charged in a very few seconds, whereas with an ordinary hand operated pump, it frequently requires twenty minutes of hard work to charge the same tire to the same or even to a less pressure.

The bearing balls 23 must be applied in working position while the plug 11 is removed and must, of course, be entered through the passage normally closed by the said plug. When the balls are applied in working position, they interlock the crank hub 22 to the cylinder casting but, of course, permit free rotation of the said parts one in respect to the other.

What I claim is:

1. A tire charging pump for automobiles comprising, a cylinder, a piston working in said cylinder, a crank hub rotatively connected to said cylinder, a crank rod connecting said crank hub to said piston, circumferentially spaced arms projecting laterally from said crank hub for engagement with the wheel hub, and a flexible connection, including a screw and nut, applied to said arms for clamping the same onto the wheel hub, substantially as described.

2. A tire charging pump for automobiles comprising, a pair of rigidly connected cylinders, a pair of rigidly connected pistons working in said cylinders, a crank hub rotatively connected to said cylinders, a crank rod connected to said crank hub and to said pistons, circumferentially spaced clamping arms projecting laterally from said crank hub and connected thereto with freedom for radial adjustment, a block and a chain attached to one of said arms and said chain having, at its free end, a nut block and a screw working loosely through said first noted block and having a screwed threaded engagement with said nut block, the said chain and screw serving to clamp the ends of said arms onto the wheel hub, substantially as described.

In testimony whereof I affix my signature in presence of two witnesses.

OSCAR M. BERGSTROM.

Witnesses:
MARIE LA PALME,
HARRY D. KILGORE.